United States Patent [19]

Haefner et al.

[11] Patent Number: 4,534,117
[45] Date of Patent: Aug. 13, 1985

[54] SPIRIT LEVEL

[75] Inventors: LeRoy H. Haefner, Edmond; Stephen M. Rhodes, Mustang, both of Okla.

[73] Assignee: Macklanburg-Duncan Company, Oklahoma City, Okla.

[21] Appl. No.: 485,239

[22] Filed: Apr. 15, 1983

[51] Int. Cl.³ .............................. G01C 9/28; E06B 3/00
[52] U.S. Cl. .......................................... 33/379; 33/381; 52/208; 277/50
[58] Field of Search ...................... 33/348.2, 377, 379, 33/381, 382, 389; 52/208, 213, 214, 395, 405, 774; 49/463, 466, 479; 220/357, 358; 277/48–50, 178

[56] References Cited

U.S. PATENT DOCUMENTS

| | | | |
|---|---|---|---|
| 1,166,045 | 12/1915 | Gethmann | 33/379 |
| 1,426,454 | 8/1922 | Bredeson | 33/381 |
| 2,175,909 | 10/1939 | Nelson | 52/403 |
| 2,280,389 | 4/1942 | Edwards | 52/208 |
| 2,536,788 | 1/1951 | Vaida | 33/381 |
| 2,669,029 | 2/1954 | Ries | 33/377 |
| 2,948,066 | 8/1960 | Rosenholm | 33/382 |
| 3,004,305 | 10/1961 | Goodemote et al. | 52/208 |
| 3,029,524 | 4/1962 | Vaida et al. | 33/381 |
| 4,259,135 | 3/1981 | Kulla | 52/774 |
| 4,283,885 | 8/1981 | Remick et al. | 49/466 |

Primary Examiner—Richard R. Stearns
Attorney, Agent, or Firm—Laney, Dougherty, Hessin, Claro & Beavers

[57] ABSTRACT

A spirit level which includes a frame having a hole therein. At least one liquid-containing leveling vial is located in the hole and is preferably mounted in a vial holder having a central opening therethrough. The vial and, where used, the vial holder are fixed to the frame. Extending substantially across the hole is a transparent sight plate held in place by a resilient annular gasket. The gasket includes an angular, annular lip which is sealingly deflected against the sight plate, and a similar lip is sealingly deflected against the portion of the frame forming the hole. The gasket preferably includes a radially outward flange which maintains the gasket in contact with the transparent plate, and which extends into a radial groove around the frame opening.

12 Claims, 5 Drawing Figures

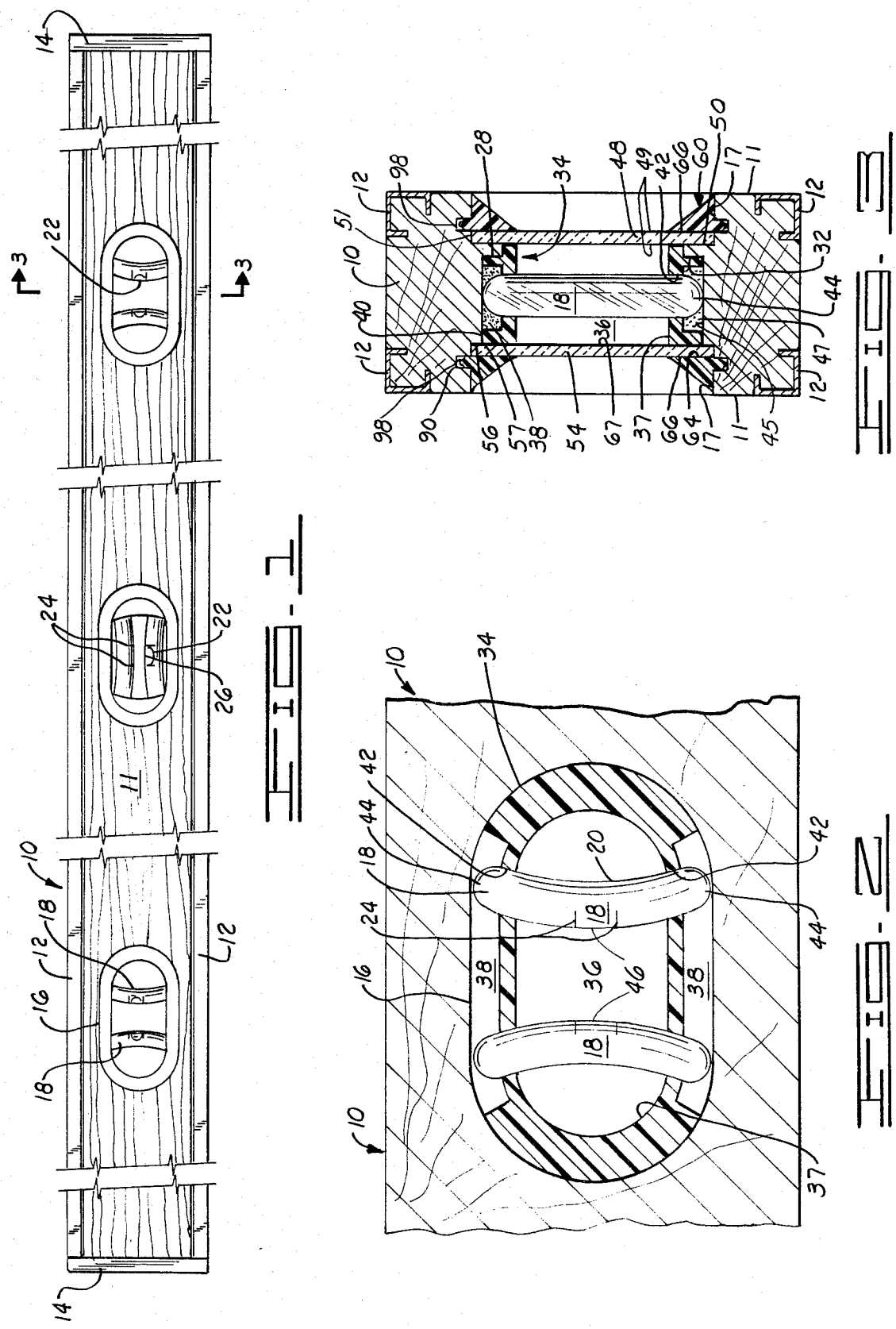

SPIRIT LEVEL

BACKGROUND AND BRIEF DESCRIPTION OF THE INVENTION

This invention relates to spirit levels, and more particularly, to means for installing and retaining liquid-containing leveling vials, and to additional means for retaining and sealing transparent sight plates used to protect the leveling vials from dirt or other foreign matter.

The spirit level includes a frame having one or more holes into which is installed a vial holder having a central opening therethrough. Tubular leveling vials extend across the central opening and pass into vial receiving ports in the vial holder. In a preferred embodiment of the level, the vials extend through the ports and terminate in recesses which open into the vial holder from its radially outer sides. These recesses are filled with cement or the like which fixes the vials in the vial holder, and concurrently attaches the vial holder to the surface of the frame forming the hole.

Previous spirit levels utilized a vial holder with no outer recesses, which required reliefs to be cut into the frame radially outward from the surface of the frame forming the hole. The ends of the vials extended into such reliefs and were cemented in place. Positioning the vials and the cementing operation are much simpler with the new configuration. In addition, the cutting of the holes in the frame is greatly simplified, and the vial holder can be easily injection molded from a plastic or similar material.

A transparent sight plate is used to cover each exposed end of the central opening through the vial holder by extension substantially across the hole in the frame. Each plate is held in place by an endless gasket having a central opening therethrough. In a preferred embodiment, a unique resilient gasket is utilized and has a first monoplanar surface which flatly contacts the plate and has a lip angling out of the monoplanar surface and sealingly deflected against the plate. The preferred gasket also includes a second peripheral surface which contacts the defining surface of the frame opening. The preferred gasket also includes a radially outward flange which extends into a radial groove around the frame hole, and the flange and grooves are dimensioned such that the monoplanar surface of the gasket is maintained in flat contact with the sight plate. The flange may be cemented into the groove to fix the gasket in position and to provide a continuous seal between the gasket, frame and sight plate.

Previous spirit levels used putty to retain the sight plate and to seal around it. Applying the putty properly was a slow and tedious process, and, after a period of time, the putty would age and crack thereby breaking the seal around the sight plate. The only method of repairing such a cracked putty seal or of replacing a broken sight plate was to return the level to the factory. The present invention eliminates these problems. In contrast to the putty, the gasket is easily and quickly installed and has a consistent, uniform appearance. A suitable material for the gasket is chosen so that it is not as prone to age or crack, thereby giving it a much improved effective service life as compared to putty. The gasket and cement materials are compatibly selected so that the gasket can be removed for simple field repair of a damaged gasket or plate.

From the foregoing description of the present invention, it will be apparent that an important object of the invention is to provide an improved vial holder structure for use in a spirit level device, which vial holder structure can be more easily located within the spirit level frame, and which can be more easily replaced if the vial holder or the vials held thereby become damaged.

A further object of the invention is to provide an improved structure for retaining protective sight glasses in position on opposite sides of liquid-containing spirit level vials in a spirit level structure.

A further object of the invention is to obviate the necessity to recaulk spirit level sight glasses which have become loose due to cracking and loss of integrity of a caulk sealant used to retain the spirit level sight glasses in the spirit level frame.

Additional objects and advantages of the invention will become apparent from the following detailed description of a preferred embodiment of the invention when the same is read in conjunction with the accompanying drawings which illustrate such embodiment.

GENERAL DESCRIPTION OF THE DRAWINGS

FIG. 1 is an elevation view of a spirit level constructed in accordance with the present invention.

FIG. 2 is a sectional detail which illustrates the installation of two leveling vials in the device shown in FIG. 1.

FIG. 3 is a sectional view taken along line 3—3 in FIG. 1 showing the manner in which gaskets are used to hold transparent plates in position on two sides of the leveling vials.

DETAILED DESCRIPTION OF A PREFERRED EMBODIMENT OF THE INVENTION

Figure 4:
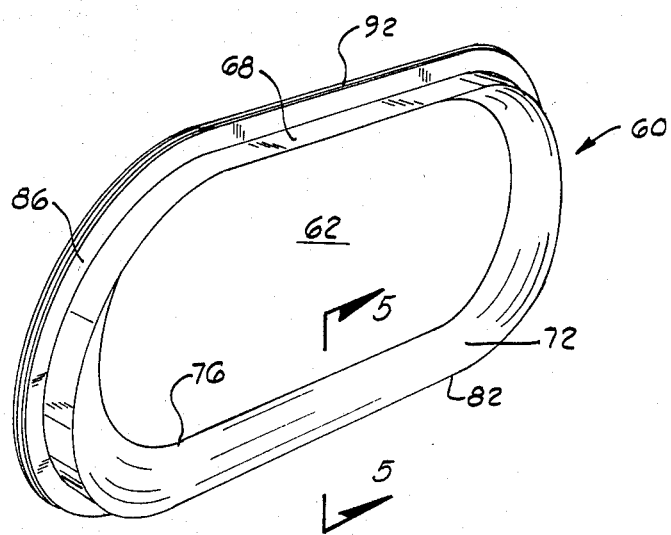
FIG. 4 is an isometric view of such a gasket.

Referring initially to the drawings, and particularly FIGS. 1, 2 and 3, the spirit level of the invention includes a rigid body or frame 10 of right parallelepiped configuration having a pair of opposed parallel planar sides 11. The frame 10 is preferably wooden which has attached protective metallic edges 12 and protective metallic end caps 14. The frame 10 is provided with holes 16 extending through frame 10 from one of said parallel sides 11 to the other and being partially bounded by surface 17 of the frame extending normal to the planar sides 11. Installed in and extending at least partially across each hole 16 are a pair of transparent liquid-containing tubular leveling vials 18 which have a longitudinal curvature 20 and opposed end portions 44. A bubble 22 is entrapped in the liquid in each vial. Inscribed on each leveling vial 18 are a pair of level indicating marks 24. These indicating marks 24 are positioned so that when the marks on a particular vial 18 are facing upward, the bubble 22 will float to the upper inside surface 26 of the vial. The bubble 22 will be centered between the indicating marks 24 when the apparatus is at true level.

Referring now to FIGS. 2 and 3, shoulder means 28 extends radially inwardly from the bounding surface 17 of each opening 16. Bearing against surface 32 of shoulder means 28 is an annular vial holder designated generally by reference numeral 34. Vial holder 34 has a central aperture or opening 36 therethrough, coaxial to hole 16, defined by a radially inner surface 37, and recesses 38 opening on opposite sides of the vial holder from a radially outer surface 40. Vial holder 34 also includes vial receiving ports 42 communicating recesses 38 with central opening 36. The pair of vials 18 pass through the vial receiving ports 42 such that the vials extend across the central opening 36, and the end portions 44 of the vials terminate in opposite recesses 38. The pair of vials 18 in each vial holder 34 are positioned such that the level indicating marks 24 of the first vial 18 face the corresponding marks on the second vial. The two vials are closest to each other at a center portion 46. Means, preferably cement 47, or the like, filling recesses 38, is used to fix the vials 18 in the vial holder 34, and concurrently to attach the vial holder to surface 32 of shoulder 28 and surface 45 of hole opening 16 in frame 10.

A first flat transparent sight plate 48 having a pair of parallel opposite sides 49 and a peripheral edge 51 is located in opening 16 such that it bears on surface 50 of shoulder 28, substantially covering one end of central opening 36. A similar second flat transparent sight plate 54, bearing on surface 56 of a shoulder means or ledge 57 in hole 16 similarly substantially covers the opposite end 58 of central opening 36. Thus, surface 50 of shoulder means 28 and surface 56 of ledge 57 are the preferred embodiment of means limiting movement of sight plates 48 and 54 toward the vials and vial holder.

Figure 5:
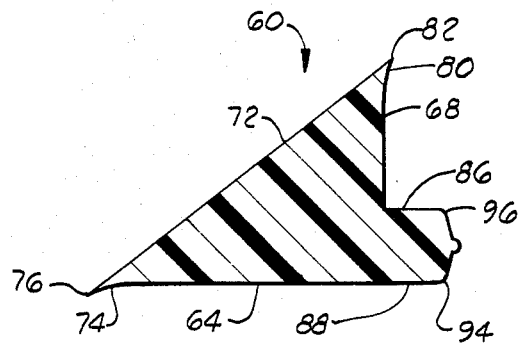
FIG. 5 is a sectional view of the gasket taken along line 5—5 in FIG. 4.

Referring now to FIGS. 3, 4 and 5, movement of each of the plates 48 and 54 away from the vials and vial holder is prevented by an endless resilient gasket designated generally by reference numeral 60 having a central opening 62 therethrough as shown in FIG. 4. Each of the gaskets is of generally triangular cross section and includes a first substantially monoplanar surface 64 which is parallel to and flatly contacts the outer surface 66 of the respective plate 48 or 54, and a second or radially outer peripheral surface 68 extending substantially parallel to, and in contact with surface or boundary 17 of hole 16, and extending at a substantially right angle to the first monoplanar surface 64. A third radially inner hypotenuse side 72 of the gasket 60 faces the gasket central opening 62.

An inner lip 74, extending around the radially inner edge 76 of gasket 60, angles out of the plane of monoplanar surface 64 in the relaxed state as best shown in FIG. 5. As shown in FIG. 3, this lip 74 is sealingly deflected into the plane of surface 64 when surface 64 is pressed into flat contact with the surface of the outer side 49 of the respective plate 48 or 54.

Similarly, an outer lip 80, extending around radially outer peripheral edge 82, angles out of peripheral surface 68 in the relaxed state as best shown in FIG. 5. The outer lip 80 projects from the base of the respective gasket toward one of the parallel planar sides 11 of the frame 10 when the gaskets are mounted in the frame. As shown in FIG. 3, lip 80 is sealingly deflected into alignment with surface 68 when the latter surface bears against the surface 17 which defines hole 16.

Means for engaging each gasket 60 within frame 10 is employed to prevent movement of the gaskets away from sight plates 48 and 54. The preferred embodiment of such means is illustrated in FIGS. 3, 4 and 5 in which gasket 60 is shown as further including a radially outward flange 86, projecting radially outwardly from the side 68 and extending into a radial groove 90 formed in frame 10 around hole 16. The groove 90 opens at the surface 17 which bounds hole 16. Surface 88 of flange 86 is preferably an extension of monoplanar surface 64.

Gasket 60 is installed by flexibly contracting the gasket along longitudinal edge 92 so that the flange 86 can be located in groove 90. For easier installation of gasket 60, corners 94 and 96 of flange 86 are radiused or chamfered. Flange 86 and groove 90 are dimensioned so that a cavity 98 forming a part of groove 90 lies radially outward from flange 86. Cavity 98 may be filled with cement of the like (not shown) to fix flange 86 in groove 90, and concurrently to provide a continuous seal thereto and with the peripheral edges of plates 48 and 54.

Although a preferred embodiment of the invention has been herein described in order to illustrate the basic principles which underlie the invention, it will be understood that various changes of structure can be made in the apparatus without departure from such basic principles or alteration of the general mode of operation. Changes and alterations of this type are therefore deemed to be circumscribed by the spirit and scope of the invention except as the same may be necessarily limited by the appended claims, or reasonable equivalents thereof.

What is claimed is:

1. Apparatus for retaining and sealing a flat plate having a pair of parallel opposite sides and an opening in a rigid body comprising:
   shoulder means on the body around the opening and bearing against one side of the plate at a location around and adjacent the peripheral edge of the plate; and
   an endless resilient gasket having a central opening therethrough and further having:
   a radially outer peripheral surface dimensioned to bear against a portion of the body defining the boundary of the opening thereinto, said radially outer peripheral surface having a first edge and a second edge opposite said first edge;
   a substantially monoplanar surface adjacent said first edge of said peripheral surface, extending parallel to the parallel sides of said plate, and substantially normal to said peripheral surface, said monoplanar surface flatly contacting the side of said plate which is opposite said shoulder means, and said monoplanar surface having a continuous edge adjacent the central opening through said gasket;
   a lip extending around said central opening at said edge of said monoplanar surface, said lip angling out of the plane of said monoplanar surface toward said plate in the relaxed state, and sealingly deflected into the plane of said monoplanar surface by contact with said plate when said monoplanar surface flatly contacts said opposite side of said plate to thereby provide a continuous seal around said plate; and
   a lip extending around said peripheral surface at said second edge, said lip angling out of said peripheral surface in the relaxed state, and adapted to be sealingly deflected to align with said peripheral surface when said peripheral surface bears against the portion of the body defining the boundary of the opening in the body to thereby provide a continuous seal around said boundary.

2. An elastomeric annular gasket for sealing and holding a transparent plate across an opening into which said plate is countersunk to close the opening, while facilitating viewing through the opening, said gasket comprising:

an annular body of elastomeric material having a central opening therethrough, and further including:
  a first substantially monoplanar side adapted to contact said plate;
  a second side at the radially outer side of said annular body and intersecting said first side at substantially a right angle and having an edge spaced from its line of intersection with said first side;
  a third, radially inner side facing the central opening through the body and intersecting the plane of said first side at an acute angle;
  an annular sealing lip at the radially inner edge of said first side at its nearest approach to said third side, and lying predominantly on the opposite side of the plane of said first side from the remainder of the annular body, and adapted to be resiliently, sealingly deflected into the plane of said first side when said first side is placed in contact with said plate; and
  a second annular sealing lip at said edge of said second side at its nearest approach to said third side, and adapted to be resiliently, sealingly deflected into alignment with said second side when said second side is placed in contact with the surface forming the opening.

3. An elastomeric gasket as defined in claim 2 and further characterized as including an annular flange around said annular body of elastomeric material and projecting radially outwardly from said second side for engaging the gasket in an annular groove to thereby retain the gasket in sealing contact with said plate.

4. An elastomeric gasket as defined in claim 2 wherein said annular body is molded polyurethane.

5. An elastomeric gasket as defined in claim 2 wherein said third side extends at an actue angle to said second side.

6. An elastomeric annular gasket for sealing and holding a transparent plate across an opening into which said plate is countersunk to close the opening, while facilitating viewing through the opening, said gasket comprising:
  an annular body of elastomeric material having a central opening therethrough, and further including:
    a first substantially monoplanar side adapted to contact said plate;
    a second side at the radially outer side of said annular body and intersecting said first side at substantially a right angle and having an edge spaced from its line of intersection with said first side;
    a third, radially inner side facing the central opening through the body and intersecting the plane of said first side at an acute angle, and further extending at an acute angle to said second side;
    an annular sealing lip at the radially inner edge of said first side at its nearest approach to said third side, and lying predominantly on the opposite side of the plane of said first side from the remainder of the annular body, and adapted to be resiliently, sealingly deflected into the plane of said first side when said first side is placed in contact with said plate; and
    a second annular sealing lip at said edge of said second side at its nearest approach to said third side, and adapted to be resiliently, sealingly deflected into alignment with said second side when said second side is placed in contact with the surface forming the opening; and
    an annular flange around said annular body of elastomeric material and projecting radially outwardly from said second side for engaging the gasket in an annular groove to thereby retain the gasket in sealing contact with said plate.

7. An elastomeric gsket as defined in claim 6 wherein said annular body is molded polyurethane.

8. A spirit level comprising:
  a frame of right parallelepiped configuration, including a pair of opposed, parallel planar sides and defining a hole extending through the frame from one of said sides to the other, the parts of said hole opening at and immediately adjacent each of the respective sides being bounded by a surface of the frame extending substantially normal to the respective adjacent planar sides;
  a liquid-containing leveling vial extending at least partially across the central portion of said hole and located between said hole parts;
  transparent sight plates extending at least partially across said hole on opposite sides of said vial and each extending substantially parallel to said opposed parallel sides;
  means between each of said sight plates and said leveling vial limiting movement of each sight plate in said hole toward said leveling vial;
  a pair of spaced gaskets in said hole retaining said sight plates against movement away from said leveing vial, each of said gaskets having an annular, centrally open configuration, and each further comprising:
    a first substantially monoplanar side bearing against one of said sight plates, and having a radially inner edge;
    an annular resilient lip projecting radially inwardly from the radially inner edge of said monoplanar side and elastically deformed into the plane of said monoplanar side by sealing contact of said lip with said one sight plate;
    a second radially outer side extending substantially parallel to said surface of the frame bounding said parts of the hole; and
    a second annular resilient lip projecting from said second side of said gasket toward one of the sides of said frame, said lip being elastically deformed into the surface of said second side by sealing contact of said lip with said surface of said frame forming the boundary of said hole parts; and
  means engaging said gasket within the frame to prevent the respective gasket from moving away from a sight plate sealingly contacted by its respective lip.

9. A spirit level as defined in claim 8 wherein the sight plate movement limiting means includes a pair of shoulders on the frame around the hole and located around and adjacent the peripheral edge of each sight plate.

10. The spirit level as defined in claim 8 wherein the gasket engaging means is comprised of:
  a pair of spaced radial grooves in the frame around said hole, and opening thereinto; and
  a radially outward flange on each of said gaskets and projecting radially outwardly from said second side of the respective gasket, said flange extending into one of said grooves such that one gasket is retained in said hole in the frame and against one of said sight plates, and the other gasket is similarly retained in said hole in the frame and against the other of said sight plates.

11. The spirit level as defined in claim 10 wherein said gasket engaging means is further comprised of:
a cavity forming a part of each of said grooves and lying radially outwardly of said flange; and
cement in said cavity fixing said gasket and forming a continuous seal adjacent said flange between said flange and said groove.

12. A spirit level comprising:
a frame of right parallelepiped configuration, including a pair of opposed, parallel planar sides and defining a hole extending through the frame from one of said sides to the other, the parts of said hole opening at and immediately adjacent each of the respective sides being bounded by a surface of the frame extending substantially normal to the respective adjacent planar sides;
a liquid-containing leveling vial extending at least partially across the central portion of said hole and located between said hole parts;
transparent sight plates extending at least partially across said hole on opposite sides of said vial and each extending substantially parallel to said opposed parallel sides;
sight plate movement limiting means between each of said sight plates and said leveling vial for limiting movement of each sight plate in said hole toward said leveling vial and including a pair of shoulders on the frame around the hole and located around and adjacent the peripheral edge of each sight plate;
a pair of spaced gaskets in said hole retaining said sight plates against movement away from said leveling vial, each of said gaskets having an annular, centrally opened configuration, and each further comprising:
a first substantially monoplanar side bearing against one of said sight plates, and having a radially inner edge;
an annular resilient lip projecting radially inwardly from the radially inner edge of said monoplanar side and elastically deformed into the plane of said monoplanar side by sealing contact of said lip with said one sight plate;
a second radially outer side extending substantially parallel to said surface of the frame bounding said parts of the hole; and
a second annular resilient lip projecting from said second side of said gasket toward one of the sides of said frame, said lip being elastically deformed into the surface of said second side by a sealing contact of said lip with said surface of said frame forming the boundary of said hole parts; and
gasket engaging means for engaging each gasket within the frame to prevent the respective gasket from moving away from the sight plate sealingly contacted by its respective lip, said gasket engaging means comprising:
a pair of spaced radial grooves in the frame around said hole, and opening thereinto;
a radially outward flange on each of said gaskets and projecting radially outwardly from said second side of the respective gasket, said flange extending into one of the grooves such that one gasket is retained in said hole in the frame and against one of said sight plates, and the other gasket is similarly retained in said hole in the frame and against the other of said sight plates;
a cavity forming a part of each of said grooves and lying radially outwardly of said flange; and
cement in said cavity fixing said gasket and forming a continuous seal adjacent said flange between said flange and said groove.

* * * * *